United States Patent [19]

Amano et al.

[11] Patent Number: 4,533,304

[45] Date of Patent: Aug. 6, 1985

[54] MOLD OPENING AND CLOSING MECHANISM FOR A TIRE VULCANIZER

[75] Inventors: Itaru Amano, Kobe; Seisuke Fukumura, Hyogo, both of Japan

[73] Assignee: Kabushiki Kaisha Kobe Seiko Sho, Kobe, Japan

[21] Appl. No.: 603,892

[22] Filed: Apr. 25, 1984

[51] Int. Cl.³ .............................................. B29H 5/02
[52] U.S. Cl. ....................................... 425/32; 425/47; 425/450.1
[58] Field of Search .................. 425/17, 19, 20, 25, 425/21, 22, 23, 24, 31, 32, 33, 35, 36, 47

[56] References Cited

U.S. PATENT DOCUMENTS

| | | | |
|---|---|---|---|
| 1,289,775 | 12/1918 | Hopkinson | 425/31 |
| 1,755,563 | 4/1930 | Schnedarek | 425/47 |
| 1,872,158 | 8/1932 | Maynard | 425/47 X |
| 2,375,784 | 5/1945 | Glynn | 425/22 |
| 3,918,861 | 11/1975 | Klose | 425/47 |
| 3,936,251 | 2/1976 | Billey | 425/33 X |
| 3,990,822 | 11/1976 | MacMillan | 425/19 X |
| 4,076,473 | 2/1978 | MacMillan | 425/47 X |

Primary Examiner—J. Howard Flint, Jr.
Attorney, Agent, or Firm—Oblon, Fisher, Spivak, McClelland & Maier

[57] ABSTRACT

A tire vulcanizer wherein a movable upper mold is vertically moved and opened and closed relative to a fixed mold, and a ball-screw shaft construction is used as a vertically moving and opening and closing mechanism. Resilient buffer devices such as belleville springs or the like are resiliently supported on both upper and lower ends of the screw shaft. An improved slide guide construction for moving the upper mold up and down is also disclosed. A slide support is provided on an engaging end with respect to the guide of the slide, and the slide support is brought into engagement with the guide in such a way that a clearance therebetween may be adjusted.

4 Claims, 9 Drawing Figures

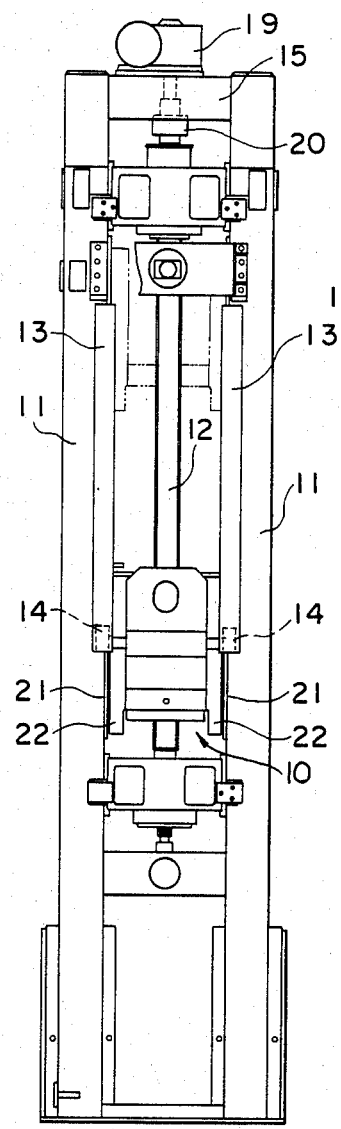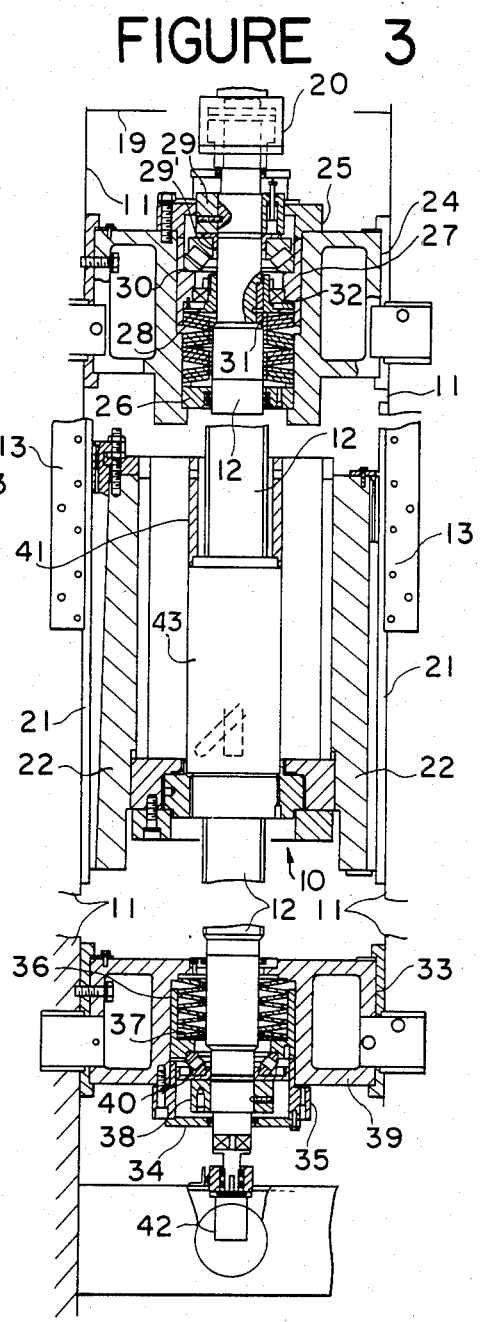

MOLD OPENING AND CLOSING MECHANISM FOR A TIRE VULCANIZER

BACKGROUND OF THE INVENTION

1. Field of the Invention

The present invention relates to a tire vulcanizer, and particularly, to an arrangement in which a movable upper mold is vertically moved and opened and closed relative to a fixed mold and a ball-screw shaft construction is used as a vertically moving and opening and closing means, in which arrangement the safety and durability of the opening and closing mechanism are increased and smooth motion is rendered possible to effect. The invention further relates to an improvement in a slide guide construction for moving the upper mold up and down in the tire vulcanizer.

2. Description of the Prior Art

As is known, in a tire vulcanizer of the divisional mold type, a lower mold is secured onto a base of the vulcanizer and an upper mold supported by a top link or other carrying member is made openable and closeable relative to the lower mold to thereby facilitate a series of vulcanizing and molding operations such as charging and setting green tires, vulcanizing and molding with the upper and lower molds closed and clamped and delivery of vulcanized tires. As means for opening and closing the upper mold relative to the lower mold there are used various known mechanisms. However, the ball-screw shaft construction has been put to practical use recently in place of usual practices such as gears provided by making use of the side frame of the vulcanizer, a mechanically opened and closed mechanism in which an upper mold support beam or a top link is moved by the side link connected to the gear, and a hydraulically opened and closed mechanism in which the upper mold support beam or top link is moved by use of a hydraulic cylinder. In this construction, the screw shaft is reversibly provided by making use of a vucanizer side frame stood upright on the base with the lower mold on the vulcanizer base sandwiched therebetween, a threaded nut is threadedly engaged with the screw shaft through a ball (e.g. a steel ball) whereby the threaded nut is moved up and down under the interposition of a ball rolled in a threaded groove through the reversible rotation of the screw shaft, and the threaded nut is integrally connected with the upper mold support beam or top link whereby the upper mold is vertically moved relative to the lower mold for opening and closing. A motor with a brake is used as a driving source for reversibly rotating the screw shaft. The opening and closing mechanism of the ball-screw shaft construction has excellent merits in that essential construction thereof is compact, the efficiency of energy is good, and troubles such as a leak of liquid-pressure fluid in the hydraulic type and deterioration caused by high heat at vulcanization whereas since the opening and closing mechanism is totally of a rigid construction, there poses a new problem relative to necessary motion in the tire vulcanizer. That is, after the upper mold has been closed completely relative to the lower mold by the rotation of the screw shaft and by the downward movement of the threaded nut, it is necessary to clamp both the molds by a separate well known means in order to resist internal pressure upon vulcanization and molding. As that time, the upper mold is further pulled down through a few strokes towards the lower mold by means of a separate fastening means with the brake of the motor with a brake released to carry out pressing and clamping operation. Although the aforesaid pull-down stroke is not great but the screw shaft is reversed by axial thrust when the brake is released during that stroke. The clamping operation is carried out in a short period of time and the screw shaft system will have a large mass resulting from a connecting shaft in an interlocking relation with the screw shaft, a reduction gear in interlocking relation with the connecting shaft, a motor with a brake and the like, and therefore, a time-lag occurs in connection with the clamping operation, and an excessive external force is exerted on parts of the screw shaft opening and closing construction, such being of a rigid construction. There is also a possibility that in the mold opening and closing operation, when the upper and lower molds come into abutment with each other to produce a shock, the ball-screw shaft construction cannot at all absorb such a shock because the construction is of a rigid construction, and ball-screw shaft construction tends to be damaged and the durability thereof is materially shortened. Particularly, in the tire vulcanizer, the upper mold has a considerable weight including assembly constructions including a thermal board (a support platen), a heat insulating material and the like. In addition, most of vulcanizers not only include a mere set of divisional molds but is of a multiple type in which at least two sets of or more divisional molds are supported on the side of a common beam or top link, and therefore, loads of heavy articles are applied to the threaded nut and the whole screw shaft. Thus, the excessive motion as described above greatly affects the durability of the opening and closing mechanism and safety due to failure to expect smooth motion operation as normally occurs in hydraulic operation.

As is also known, in the tire vulcanizer which uses the divisional mold, a lower mold is secured to a vulcanizer base and an upper mold is held on a slide vertically movably supported on a fixed frame such as a column or the like stood upright on the base, whereby the upper mold is opened and closed relative to the lower mold through upward and downward movement of the slide to effect delivery and the setting of green tires on the lower mold and vulcanization and molding of tires between both divisional molds through closing and clamping of the upper mold. At this time, in motion of the slide which is moved up and down while holding the upper mold, the parallelism of the slide with respect to the base is properly maintained and deviation in the center of the molds is minimized, when the slide is moved up and down to enhance the vulcanizing accuracy and prolong the service life of the molds by registration of the upper and lower molds, which are requirements for such motion of the slide. In the past, therefore, a guide having a vertical guide surface has been provided on the side of a fixed frame such as a column, and an end of the slide brought into engagement with said guide to control upward and downward movement thereof. On the other hand, in the tire vulcanizer, heating sources are housed in both the molds for vulcanization and molding and in addition, steam or other heating medium is supplied into the tire. Therefore, the slide portion undergoes thermal expansion due to propagation of such thermal energies. It is necessary to provide beforehand a clearance between the slide surface of the slide and the guide surface of the guide. If this clearance is smaller than the amount of thermal expansion, excessively high surface pressure is produced between the slide surface and the guide surface and therefore burning tends to occur during sliding due to repetitious upward and downward movement. If the clearance is provided largely to avoid an occurrence of such problem, poor parallelism of the slide lower surface to the base surface and deviation from the center position tend to occur, leading to difficulties such as lowering of vulcanization accuracy, shortening of the service life of molds and the like. This drawback is inherent in the conventional type of rigid construction which merely comprises the slide and the guide.

SUMMARY OF THE INVENTION

The present invention has been achieved in an attempt to overcome these problems noted above with respect to prior art.

According to one aspect of the present invention, there is provided an arrangement wherein an upper mold is vertically movably and openably and closeably provided with respect to a lower mold which is fixed, said vertically moving and opening and closing means comprising a ball-screw shaft construction composed of a reversibly rotatable screw shaft and a threaded nut vertically movably and threadedly engaged with the screw shaft through a ball, wherein resilient buffer devices such as belleville springs or other elements are resiliently supported on both upper and lower ends of the screw shaft.

According to another aspect of the invention, there is provided an arrangement wherein, in a tire vulcanizer for vulcanizing and molding a green tire by a divisional mold which comprises a lower mold fixed onto a base and an upper mold vertically movably supported on a frame stood upright on said base so that the upper mold is opened and closed with respect to said lower mold, a slide support is provided at the engaging end of a slide between a vertical guide of said frame and the slide which supports said upper mold and slidably engages said guide, said slide support being restricted in a vertical direction parallel to the vertical guide surface of said guide, being slidable in a lateral direction orthogonal to said guide surface and being adjustably held by means of a resilient element such as a spring, and being brought into engagement with said guide in such a way that a clearance therebetween may be adjusted.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 2 is a side view of the vulcanizer of FIG. 1;

FIG. 3 is a longitudinal, sectional, side view showing essential parts of an embodiment of a mechanism in accordance with the present invention;

DETAILED DESCRIPTION OF THE PREFERRED EMBODIMENTS

Figure 1:
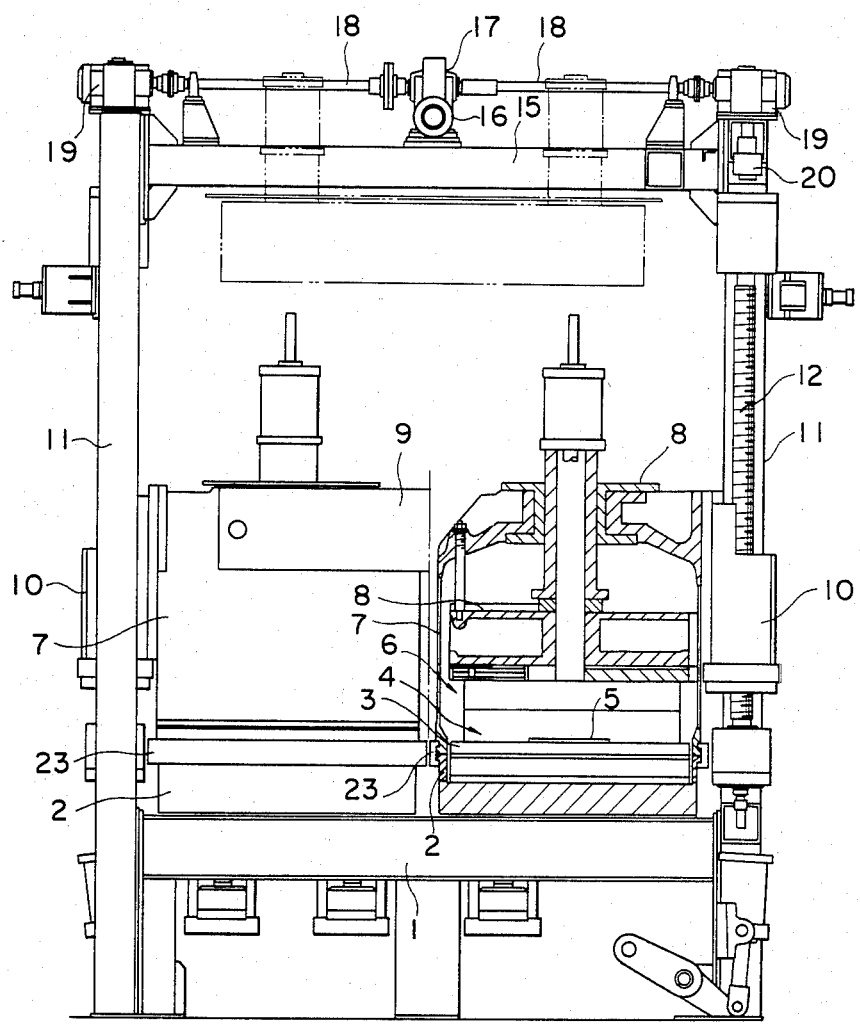
FIG. 1 is a partial longitudinal sectional, elevation of one embodiment of a tire vulcanizer carrying out the present invention.

Referring now to FIGS. 1 and 2. a lower mold 4 is fixedly disposed on a vulcanizer base 1 through a lower dome 2 and a support 3 in a known manner, and a center mechanism 5 is disposed in the center of the lower mold 4, said mechanism 5 being provided with a bladder for vulcanization and molding and its operating means and means for supplying a vulcanizing heating medium. An upper mold 6, which is vertically movably and openably and closeably provided with respect to the lower mold 4, is constructed through an upper dome 7 facing to the lower dome 2, a support 8 and a mold height adjusting device 9. In the illustrated case, there is shown one example in which two sets of upper and lower divisional molds but the upper domes 7 of two upper molds 6, 6 are formed integrally with each other by a common support beam. Thus, in this case, there is shown one example in which three parts, i.e., the upper domes 7, 7 and support beam 9 are formed integrally with one another to form a carrying member for the upper molds 6, 6. Side frames 11, 11 are stood upright at a symmetrical position with two sets of divisional molds sandwiched therebetween on both left and right sides of the vulcanizer base 1, each side frame 11 having a screw shaft 12 reversibly rotatably provided. Ball-screw and nut assemblies 10, 10 are fixedly mounted on both side ends of the upper mold carrying member consisting of three parts, i.e., the upper domes 7, 7 and support beam 9. Threaded nuts 43 in the assemblies 10, 10, are threadedly engaged with screw shafts 12, 12 through a threaded groove of a ball member (a steel ball) and the screw shafts 12, 12 are synchronously reversibly rotated whereby the ball threaded nut assemblies 10, 10 are moved up and down and the upper mold 6 is thereby opened and closed with respect to the lower mold 4. At this time, liners 21, 21 are provided at a position of the side frames 11 between which both front and rear sides of the ball screw nut assemblies 10, slides 22, 22 of the assemblies 10 are slidably connected to the liners 21, 21, and guide rollers 14, 14 provided on the side of the assemblies 10 are rollingly engaged with guide plates 13, 13 on the side of the side frames 11 so that straight forward movement and vertical movement of the assemblies 10 are guided. As means for synchronously reversibly rotating the pair of screw shafts 12, 12 a motor 16 with a brake and driving and rotary shafts 18, 18 interlocked with the motor 16 through a worm reduction gear 17 are provided making use of a top beam 15 connected between upper portions of the side frames 11, 11, said rotary shafts 18, 18 having each of the other ends connected in an interlocking fashion with the upper end of the screw shafts 12, 12 through a worm reduction gear 19 and a joint portion 20.

The aforementioned tire vulcanizer and the ball screw shaft construction has a vertically moving and opening and closing means which are merely one known example and are generally similar to those illustrated though details thereof are different from each other. In FIG. 1, an openable and closable clamp ring indicated at 23 is provided to clamp the upper and lower domes 7 and 2 when the upper and lower molds are closed and clamped. The conventional ball screw shaft construction is of the rigid construction in which the upper end of the screw shaft 12 is connected to the side of the worm reduction gear 19 by the joint portion 20 as previously described and the lower end of the screw shaft 12 is rotatably supported on the side of the side frame 11 through a bearing construction.

The present invention proposes, in the mold opening and closing type as described above, a supporting construction of the screw shaft 12 as illustrated in FIG. 3. That is, a housing 24 for rotatably loosely inserting the screw shaft 12 to the side frame 11 is provided below the joint portion 20 (which is of the gear coupling construction in the illustrated embodiment) with the worm reduction gear 19 in the screw shaft 12, said housing having a flange 25 secured to the upper end thereof and having a collar 26 slidably received and locked at the lower end thereof. In the illustrated embodiment, a belleville spring is interposed as a resilient buffer element between a support 27 received within the housing 24 and the collar 26 at a lower level of the flange 25. Between the support 27 and the screw shaft 12 is interposed a thrust bearing 30 through a nut 29 and a spacer ring 29' secured to the screw shaft 12, and a radial bearing 32 through a slide bush 31 keyed to the screw shaft 12 whereby the screw shaft 12 may be rotatably supported and the belleville spring 28 may be resiliently supported. At the lower end side of the screw shaft 12 is likewise provided a housing for rotatably and loosely inserting into the lower end of the screw shaft 12 into the side frame 11, and a flange 35 having a cover 34 is secured to the lower end of the housing 33. In the illustrated embodiment, a belleville spring 37 is resiliently interposed between a support 36 received in the housing 33 and the upper end of the housing 33, and a thrust bearing 40 is provided through a nut 38 and a seal cover 39 secured to the screw shaft 12 between the support 36 and the screw shaft 12, whereby the screw shaft 12 may be likewise rotatably supported and the belleville spring 37 may be resiliently supported. In the illustrated embodiment, a reference numeral 41 designates a stopper post for indicating an upper limit in the ball screw nut assembly 10, the stopper post abutting against the collar 26. A reference numeral 42 designates a sensor provided at the lowermost end of the screw shaft 12.

The resiliently supporting construction for the screw shaft 12 by use of the belleville springs 28, 37 and other resilient buffer elements is greatly advantageous in the following various points over the conventional ball screw shaft construction of the rigid structure. The present invention is exactly the same as the prior art in that the ball screw nut assembly 10 is vertically moved up and down by the reversible rotation of the screw shaft 12 whereby the upper mold 6 is opened and closed with respect to the lower mold 4. However, after the upper mold 6 has been moved down to totally close the lower mold 4, the joined upper domes 7 and 2 are clamped by means of the clamp ring 23 and the upper dome 7 is pulled down by the hydraulic cylinder or other pull-down mechanisms, then both the molds 4 and 6 are fastened together (the details of which are not described since there are many known means). In starting the fastening operation, it is necessary to downwardly move the ball screw nut assembly 10 integrally with the upper dome 7. Therefore, in the motor 16 with a brake, the brake is released to free the screw shaft 12 and during the downward-movement stroke (approx. 6 mm at maximum) necessary for clamping, the screw shaft is reversed by an axial thrust on the side of the freed screw shaft 12. However, the screw shaft 12 is not a mere screw shaft but is bodily formed as a large mass in association with the reduction gears 19, 17, rotary shafts 18, 18 and motor 16 and thus cannot be rotated immediately in response to the clamping. A time lag occurs before the clamping during which time lag the upper belleville spring provided in the present invention becomes compressed within the housing 24 to safely overcome application of excessive external force to various parts of the opening and closing mechanism to eliminate scratches and damage in various parts of the rigid construction. In closing the upper and lower molds 6 and 4, when the upper mold 6 abuts against the lower mold 4, the shock is considerably greatly coupled with a large weight on the side of the upper mold. The thrust resulting from the shock tends to suddenly push up the ball screw nut assembly 10. However, this force acts on the belleville spring 37 through the nut 34, a thrust bearing 40 and a support 36 at the lower end of the screw shaft 12 and therefore, the shock is absorbed and damped by the belleville spring 37. Similarly, such effectively prevents various parts of the rigid construction, including the assemblies 10 and the screw shaft 12, from being applied with excessive forces and to prevent various parts including the screw portions from being damaged. Furthermore, the belleville spring 28 within the housing 24 at the upper part serves not only as a buffer during the clamping but also as a buffer of the open upper limit stopper for the upper mold 6. That is, normally, opening operation (upward moving operation) of the upper mold 6 of this kind is stopped through an electric signal produced by detection of a limit switch or the like, but if any trouble should occur, the stopper post 41 provided on the ball screw nut assembly 10 rests on the collar 26 located at the lower end of the housing 24 to thereby prevent collision and damage to the various parts and moreover, the occurrence of shock at the time of abutment is also safely damped by the belleville spring 28.

As described above, in the present invention, the belleville springs 28, 37 and other resilient buffer elements are resiliently interposed and supported between the upper and lower end of the screw shaft 12 whereby the damage to various parts due to the rigid structure, that is, deformation in the threaded portions and threadedly engaging portions, deviation and deformation in meshing and engaging portions and the like, which have been previously often encountered at the mold opening and closing and clamping in the prior art opening and closing mechanism merely consisting of the screw shaft 12 and the ball screw nut assembly 10, can be eliminated to provide transmission of a smooth motion, extremely effective maintenance of various parts and enhancement of durability. This leads to a considerable extension of service life of the mold opening and closing mechanism which is most frequently moved and thus is apt to produce damage in the vulcanizer. In addition, in accommodating the resilient buffer elements, a housing for rotating and supporting the screw shaft 12 or the like can be utilized to install them very easily and in a compact manner. Particularly, the mechanism of the present invention is greatly advantageous in improving the mold opening and closing which uses the ball screw shaft construction.

Figure 4:
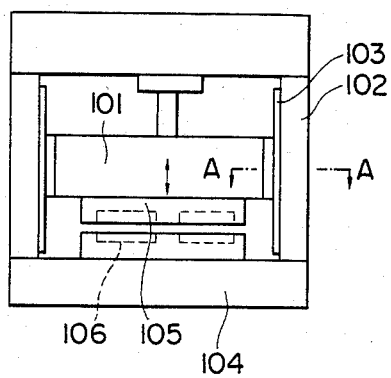
FIG. 4 is an explanatory view of one example of a tire vuclcanizer.
Figure 5:
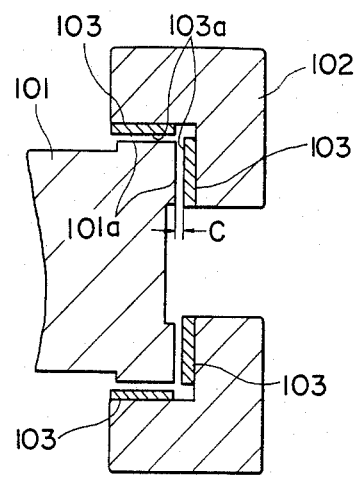
FIGS. 5 through 7 are respectively sectional views taken on line A—A of FIG. 4 of different types of the relational construction between a slide and guide of the present invention.
Figure 6:
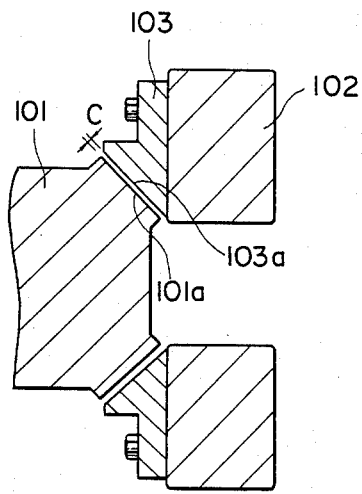
Figure 7:
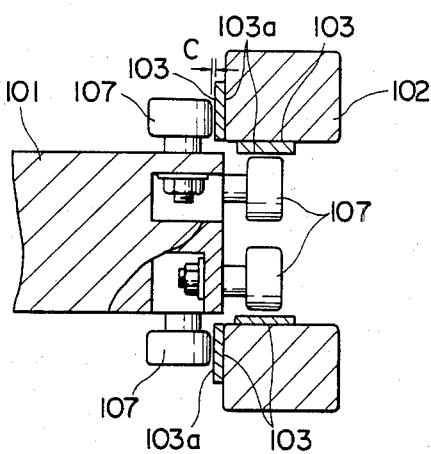

Next, a further embodiment of the present invention will be described relating to FIG. 4 which shows a basic example of the tire vulcanizer according to the present invention. A lower mold 106 is secured onto a base (bed) 108 and a guide 103 having a vertical guide surface is provided on a column 102 which is a frame stood upright on the base, whereby a slide 101 supporting an upper mold 105 is vertically movably engaged with the guide 103 so that the upper mold 105 is opened and closed with respect to the lower mold 106 to effect a series of tire vulcanizing and molding operations such as delivery of a green tire to the lower mold 106, downward movement and closing of the upper mold 105 and vulcanizing, pressing and molding of the green tire under heating, upward movement and opening of the upper mold 105, discharge of the vulcanized tire on the lower mold 106, and the like in a known manner. The relational construction between the slide 101 and the guide 103 is typically shown by the conventional type illustrated in FIGS. 5, 6 and 7 which are respectively sectional views taken on line A—A of FIG. 4. In the FIG. 5 illustration, the slide 101 is provided at the side end and front and rear ends in the engaging end thereof with vertical slide surfaces 101a, respectively, which are opposed to a vertical guide surface 103a in the guide 103 provided on the corresponding surface in the column 102. In the FIG. 6 illustration, the vertical slide surface 102a in the slide 101 and the vertical guide surface 103a in the guide 103 are diagonally opposed. In the FIG. 7 illustration, in the slide 101, a roller 107 is used in place of the slide surface 101a illustrated in FIGS. 5 and 6. In these conventional assemblies, a rigid construction is adopted, and a clearance C shown in these Figures is predetermined to thereby correspond to thermal expansion of the slide 101. Thus, if the clearance C is set so as to be a small amount, parallelism relative to the base 104 and deviation in center position of mold when the slide 101 is moved up can be minimized while burning or the like is likely to occur due to the excessively high surface pressure. If the clearance C is made large to prevent this, poor parallelism, deviation in center or the like are likely to occur.

Figure 8:
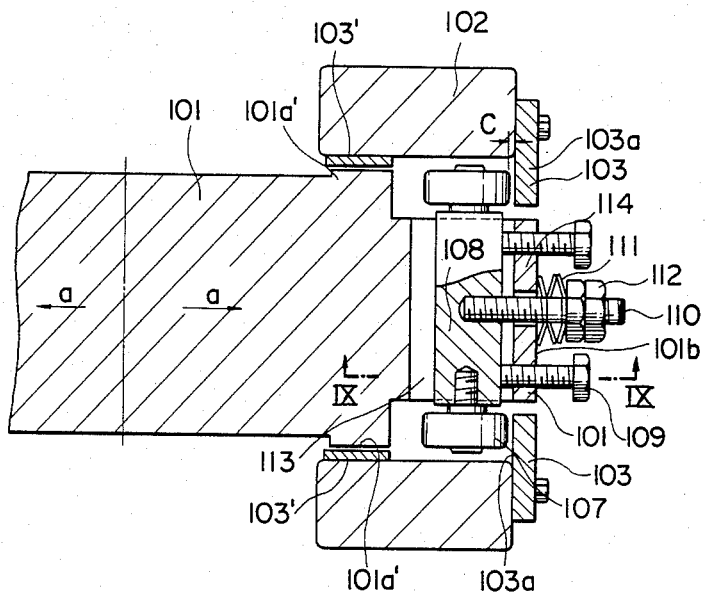
FIG. 8 is a cross sectional plan view showing essential parts of an embodiment of the present invention.
Figure 9:
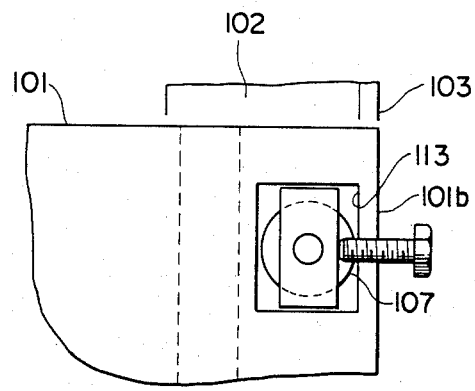
FIG. 9 is a sectional view taken on line IX—IX of FIG. 8.

On the other hand, an object of the present invention is to provide a slide guide construction as illustrated in FIGS. 8 and 9. While in the illustrated embodiments a roller 107 is used in place of the slide surface 101a previously shown in the well-known embodiments, it will be noted of course that the present invention also includes the use of the slide surface 101a'. That is, there is provided the guide 103 having the guide surface 103a provided on the outer end in the column 102, a quadrilateral square window hole 113 is bored in a longitudinal direction, and a slide support 108 in the form of a likewise quadrilateral square bar or a block is supported on the engaging end of the slide 101, with upper and lower sides of the quadrilateral engaged with upper and lower sides of the hole 113 and with left and right sides thereof spaced from left and right sides of the hole 113, in such a way that the support is moved along with the slide 101 while being restrained vertically and is individually slidable in a lateral direction (in a direction orthogonal to the vertical guide surface 103a of the guide 103). In the illustrated case, rollers 107, 107 are provided on both front and rear ends of the slide support 108 and are opposed to the vertical guide surface 103a of the guide 103, an adjusting bolt 10 provided on one side in the central portion of the support 108 is projected externally of a side end 101b of the slide 101 through an inserting hole 114 formed in one side corresponding to the window hole 113, a belleville spring 111 as a resilient element in the form of a spring in the illustrated embodiment is resiliently interposed between a nut 112 threadedly engaged with the adjusting bolt 110 and said side end 101b, and a stop bolt 9 threadedly inserted into the window hole 113 from the side end 101b side on the same side as that of the adjusting bolt 110 is carried on the side end of the slide support 108. In the illustrated embodiment, a reference numeral 103' designates a second guide provided on front and rear surfaces between which the slide 101 in the column 102 is sandwiched, and 101a' designates a slide surface formed on the slide 101 side corresponding to the guide 103'. It is noted that the slide surface 101a can be used in place of the roller 107 in the slide support 108, and also a buffer material other than the spring can be used as a resilient element.

In the slide 101 and the guide 103 in the present invention, in locking and setting the slide support provided on the slide 101, first the stop bolt 109 is sufficiently loosened so as not to come into contact with the slide support 108, and the nut 112 in the adjusting bolt 110 provided on the support 108 is then tightened until the clearance C between the shown roller 107 and the vertical guide surface 103a of the guide 103 assumes an initial amount of clearance as desired. After the support has been set as described above, the stop bolt 109 so far loosened is tightened until it lightly comes into contact with the side end of the support 108, and the nut 112 is then tightened until an amount of preset flexture of the belleville spring 111 is reached. With this locked state, presetting the slide support 108 will be completed and the device used with the clearance C maintained. When the tire vulcanizer is operated and at the same time the slide 101 is thermally expanded as shown by the arrow a of FIG. 8 by the thermal load thereof, the slide support 108 inserted into and locked within the window hole 113 of the slide 101 is also moved and since the column 102 is fixed, the clearance C is zero. If the slide 1 is kept extended, movement of the slide support 108 and roller 107 in the direction as indicated at a is controlled by the fixed guide 103 and stops but, since the belleville spring 111 on the adjusting bolt 110 of the support 108 is resiliently supported, it is urged against the guide 103 through the resiliency of the belleville spring 111, at which time, a clearance is created between the stop bolt 109 and the support 108. Accordingly, the amount of thermal expansion in the slide is predeterined and a flexural load of the belleville spring at that time is set to a predetermined whereby both the sliding surfaces are as free from burning as possible to provide smooth vertical movement without producing excessively high surface pressure between the guide surface 103a and roller 107. At the same time, thereby, the initial clearance C can be miniaturized and therefore, the parallelism with respect to the base 108 and deviation in the center of the molds can be minimized to provide good quality of products coupled with the enhancement of vulcanizing accuracy. Furthermore, since the load applied to the guide 103 is also controlled and determined by the belleville spring 111, it is not only possible to prevent the guide 103 from being applied with an exceesively great load but to increase the service life of molds due to securement of registration between the upper and lower molds.

Unlike the conventional guide of upward and downward movement by a mere rigid construction of the slide 101 and guide 103, the present invention includes the provision of soft construction of the slide support 108 which is moved along with the slide 101 on the side thereof and is independently movable through a resilient (buffer) element such as a spring whereby it is possible to freely set the initial clearance similarly to the conventional slide 101 and guide 103. Furthermore, when the slide 101 is expanded due to the thermal expansion, a force greater than a predetermined level is not produced in the guide 103, and therefore, burning problems are not at all produced as encountered in prior art. Moreover, since the clearance can be made small, most important requirements in which the parallelism of the slide 101 and the base 104 and the deviation in center of molds are minimized are sufficiently satisfied. For example, in the tire vulcanizer as shown in the drawing, where the distance between the columns 102 and 102 is 104 m and the rise in temperature $\Delta t = 50°$, the amount of thermal expansion is 2.2 mm. In the conventional type, the amount of thermal expansion required is above 2.2 mm with the clearance C but in the present invention, no problem occurs even where the clearance C is zero and the securement of parallelism and retainability of center are materially enhanced. Yet, the construction of the present invention does not required a great change in conventional construction, addition of a simple construction on the side of the slide 101 will suffice, and the construction of the present invention is excellent as a slide guide for the tire vulcanizer which is affected by the heat.

Obviously, many other modifications and variations of the present invention are possible in the light of the above teachings. It is therefore to be understood that, within the scope of the appended claims, the invention may be practiced otherwise than as specifically disclosed.

What is claimed is:

1. A mold opening and closing mechanism for a tire vulcanizer, comprising:
   an upper movable mold and a lower fixed mold;
   means for vertically moving said upper mold to open and closed positions with respect to said fixed lower mold wherein said means for moving said upper mold further comprises a ball-screw shaft assembly including a reversibly rotatable screw shaft and a threaded nut vertically movably and threadedly engaged with said screw shaft through a ball member; and
   resilient buffer means resiliently supported on both upper and lower ends of the screw shaft.

2. A tire vulcanizer for vulcanizing and molding a green tire by means of a divisional mold, comprising:
   a base;
   a frame stood upright on said base and having a vertical guide;
   a lower mold secured to said base;
   an upper mold openable and closable relative to said lower mold;
   means for vertically movably supporting said upper mold on said frame;
   a slide support means positioned between said vertical guide and said means for supporting said upper mold and which comprises means for engaging said guide, said slide support means being provided on an engaging end of said means for supporting proximate said guide, being restrained against vertical motion with respect to said means for supporting, being slidable with respect to said means for supporting in a lateral direction orthogonal to said guide and being adjustably and resiliently held in position, wherein said slide support is brought into engagement with said guide such that a clearance between opposed surfaces thereof is adjustable.

3. The device according to claim 2, wherein said frame further comprises a second vertical guide and said means for supporting further comprises a slide surface for contacting said second vertical guide.

4. The device according to claim 2, further comprising a buffer member for providing said resilient holding of said slide support means.

* * * * *